May 15, 1934.    C. N. KNAPE    1,958,894
RESILIENT DRIVING MECHANISM
Filed Jan. 7, 1932
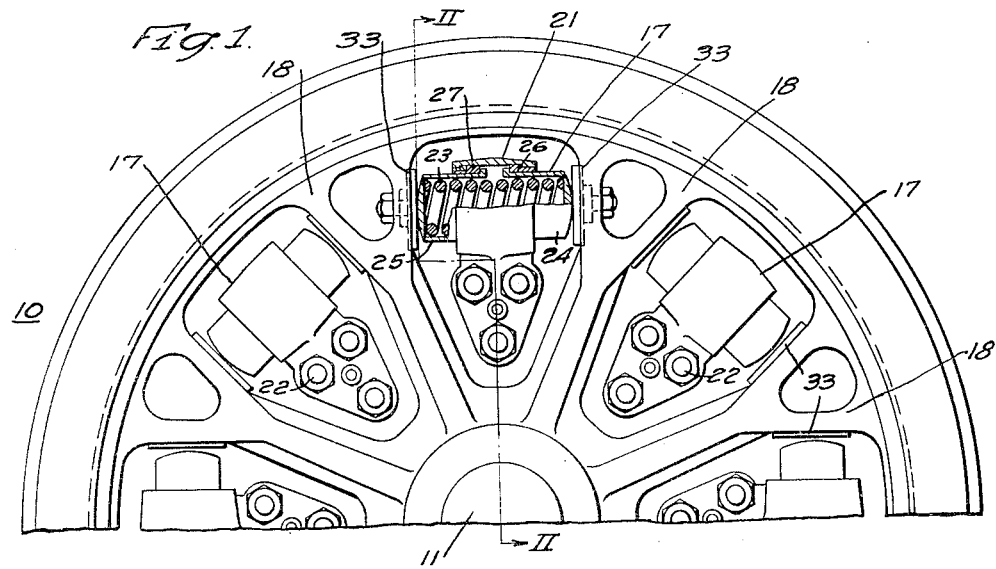
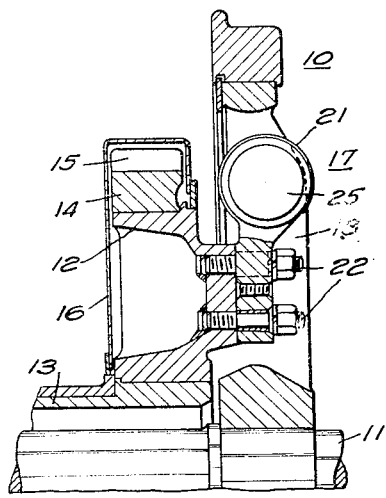
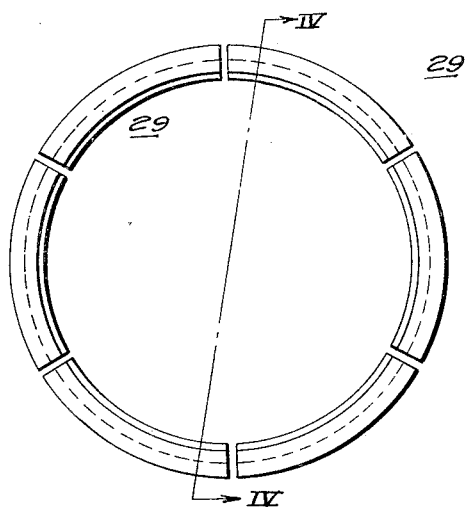
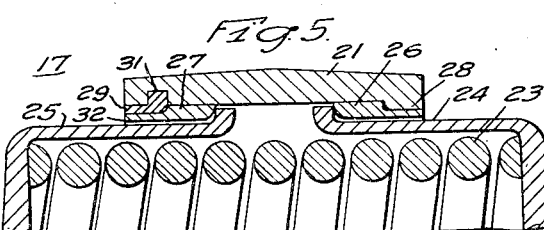
WITNESSES:
E. A. M'Closkey.
N. G. Chilcott
INVENTOR
Charles N. Knape
BY
J. M. Crawford
ATTORNEY Patented May 15, 1934

1,958,894

UNITED STATES PATENT OFFICE 1,958,894

RESILIENT DRIVING MECHANISM

Charles N. Knape, Forest Hills, Pa., assignor to Westinghouse Electric & Manufacturing Company, a corporation of Pennsylvania Application January 7, 1932, Serial No. 585,184

7 Claims. (Cl. 105—131)

My invention relates, generally, to resilient driving mechanisms, and more particularly, to those designed for use in connection with locomotive drives of the quill type, wherein spring elements are interposed between the quill arms and the traction wheels to effect resiliency between the driving motors and the traction wheels.

The object of my invention, generally stated, is to provide an improved resilient driving mechanism, suitable for application to locomotives, that shall be simple and efficient in operation and that may be readily and economically manufactured and assembled.

A more specific object of my invention is to provide improved means for retaining the various parts of a resilient driving mechanism in operative relation.

Other objects of the invention will be either explained fully hereinafter or will be apparent to those skilled in the art.

For a fuller understanding of the nature and scope of the invention, reference may be had to the following detailed description, taken in connection with the accompanying drawing in which:

Figure 1 is a view, partially in side elevation and partially in section, of a portion of a locomotive driving wheel embodying my invention;

Fig. 2 is a sectional view taken along the line II—II of Fig. 1;

Fig. 3 is an enlarged view, in end elevation, of a bushing retainer utilized in the resilient driving mechanism;

Fig. 4 is a sectional view, taken along the line IV—IV of Fig. 3, and

Fig. 5 is an enlarged sectional view of a portion of one of the resilient driving mechanisms shown in Fig. 1.

Referring now to the drawing, a locomotive driving wheel 10 is secured to an axle 11 and is driven by a gear center 12, which is mounted upon a quill 13 that surrounds the axle 11. The gear center 12 is provided with a gear rim 14 having a plurality of teeth 15. A gear casing 16 is provided for enclosing the driving gear.

As shown in Figs. 1 and 2, a plurality of resilient driving units 17 are mounted upon the gear center 12 in spaced relation and are disposed between the spokes 18 of the driving wheel 10. Each of the resilient driving units 17 is comprised of an integral tubular casing and bracket 21 that is secured to the gear center 12 by means of suitable tapered bolts 22. A helical spring 23 is disposed within the casing 21 and is retained in position therein by means of two cup-like members 24 and 25 which are provided with flanges at their inner edges. Flanged retaining bushings 26 and 27 are provided for slidably supporting the spring cups 24 and 25, and are so disposed within the tubular casing 21 as to prevent the spring cups from being forced out of the casing.

It will be observed that one end of the casing 21 is provided with an inwardly extending flange 28 that engages the flanged bushing 26 to retain it and the cup 24 within the casing 21.

In order that the spring 23 and the cups 24 and 25 may be readily assembled within the integral casing 21 and shall be positively locked in operative relation during the operation of the locomotive, a flanged retainer 29 is provided for retaining the bushing 27 within the casing 21. As shown in Fig. 5, the flange of the retainer 29 is so disposed in a groove 31, provided in the inner face of the casing 21, that the bushing 27 and the cup 25 cannot be forced outwardly by the reaction of the spring 23.

The resilient driving unit may be assembled as follows: the bushing 26 is first pressed into the casing 21 from the left until its flange engages the flange 28 on the casing 21, the cup 24 may then be placed inside of the bushing 26 and the spring 23 within the cup. The cup 25 is then placed over the spring 23 and the bushing 27 pressed into the casing 21 until its outer edge 32 is even with the inner edge of the groove 31 in the casing 21. The flanged retainer 29, which may be cut into a plurality of segments as shown in Fig. 3, may then be placed into the groove 31 after which the bushing 27 may be pressed outwardly to the operative position shown in the drawing, by applying force to the cup 24.

As shown in Fig. 1, the faces of the spokes 18 of the driving wheel are provided with removable wearing plates 33 which abut the bottoms of the spring cups, thereby receiving the driving force of the gear 12. When the plates 33 become worn they may be readily removed and replaced by new plates. The cups and bushings may also be readily replaced by new members, when necessary and in this manner all parts of the driving mechanism which are subjected to wear may be renewed, thereby greatly increasing the life and efficiency of the driving mechanism.

From the foregoing description, it will be evident that I have provided a resilient driving mechanism which is efficient and reliable in operation and which may be economically manufactured and assembled. Furthermore, the various parts of the mechanism are locked together to withstand the driving forces, but may be readily disassembled to permit replacement.

I do not desire to be restricted to the specific embodiment of my invention herein shown and described since it is evident that it may be changed and modified without departing from the spirit and scope of my invention as defined in the appended claims.

I claim as my invention:

1. The combination with a driving member and a driven member, of an integral flanged casing and bracket member attached to one of said members, a spring element disposed within the casing, cup members for retaining the spring element, bushing members for slidably supporting the cups in operative position in the casing, and means cooperating with the flanged casing to lock the bushings within the casing.

2. The combination with a driving member and a driven member, of a flanged casing attached to one of the members, a spring element disposed within the casing, flanged cup members for retaining the spring element, bushings for slidably supporting the cups in operative position in the casing, and flanged means cooperating with the flanged casing to lock the bushings within the casing.

3. The combination with a driving member and a driven member, of a flanged tubular casing attached to one of said members, a spring element disposed within the tubular casing, flanged cup members for retaining the spring element, bushings for slidably supporting the cups in operative position in the casing, one of said bushings being interposed between the flange on the casing and the flange on one of said cups, and flanged means interposed between the other bushing and the casing for locking the bushing in the casing.

4. The combination with a driving member and a driven member, of a tubular casing attached to one of said members, said casing having an inwardly extending flange at one end and a groove in its inner surface near the other end, a spring element disposed within the casing to resiliently drive the other member, flanged cup members for retaining the spring element, bushings for slidably supporting the cup in operative position in the casing, one of said bushings being interposed between the flange on the casing and the flange on one of said cups, and flanged retaining means disposed in the groove in the casing to lock the other bushing in the casing, thereby preventing the spring-retaining cups from being forced out of the casing by the reaction of the driven member.

5. The combination with a driving member and a driven member, of an integral tubular casing attached to one of said members, said casing having an inwardly extending flange at one end and a groove in its inner surface near the other end, a spring element disposed within the casing to resiliently drive the other member, flanged cup members for retaining the spring element, a pair of bushings for slidably supporting the cups in operative position in the casing, one of said bushings being interposed between the flange on the casing and the flange on one of said cups, and a plurality of flanged retaining segments disposed in the groove in the casing to lock the other bushing in the casing, thereby preventing the spring-retaining cups from being forced out of the casing by the reaction of the driven member.

6. In a locomotive drive mechanism, in combination, a drive wheel provided with a plurality of spokes, a driving member for operating the drive wheel, an integral tubular casing attached to the driving member and disposed between two spokes of the drive wheel, said casing having an inwardly extending flange at one end and a groove in its inner surface near the other end, a spring element disposed within the casing to resiliently drive the wheel, a pair of flanged cup members for retaining the spring element and disposed to abut the said spokes, a pair of bushings for slidably supporting the cups in operative position in the casing, one of said bushings being interposed between the flange on the casing and the flange on one of said cups, and a plurality of flanged retaining segments disposed in the groove in the casing to lock the other bushing in the casing, thereby preventing the spring-retaining cups from being forced out of the casing by the reaction of the drive wheel.

7. The combination with a driving member and a driven member of a tubular casing attached to one of said members, said casing having an inwardly extending flange at one end and a groove in its inner surface near the other end, a spring element disposed within the casing to resiliently drive the other member, flanged cup members for retaining the spring element within the casing, one of said cup members being retained in operative position in the casing by the flange on one end of the casing, and flanged retaining means disposed in the groove in the casing to retain the other cup member in operative position in the casing.

CHARLES N. KNAPE.